United States Patent [19]

Tabuse

[11] Patent Number: 4,987,964
[45] Date of Patent: Jan. 29, 1991

[54] ELECTRIC POWER STEERING SYSTEM
[75] Inventor: Hidetoshi Tabuse, Osaka, Japan
[73] Assignee: Koyo Seiko Co., Ltd., Osaka, Japan
[21] Appl. No.: 384,603
[22] Filed: Jul. 25, 1989
[30] Foreign Application Priority Data
  Jul. 30, 1988 [JP] Japan .................... 63-191617
[51] Int. Cl.⁵ .............................. B62D 5/04
[52] U.S. Cl. .................... 180/79.1; 180/142
[58] Field of Search ............ 180/79.1, 141, 142
[56] References Cited
  U.S. PATENT DOCUMENTS 4,809,173  2/1989  Fukami et al. ............. 180/79.1
  4,834,201  5/1989  Miyazaki et al. ........... 180/79.1
  4,837,690  6/1989  Morishita et al. .......... 180/79.1
  4,862,366  8/1989  Morishita et al. .......... 180/79.1
  4,869,334  9/1989  Marumoto et al. .......... 180/79.1

FOREIGN PATENT DOCUMENTS 0353656  2/1990  European Pat. Off. .

Primary Examiner—Kenneth R. Rice
Attorney, Agent, or Firm—Armstrong, Nikaido, Marmelstein, Kubovcik, & Murray

[57] ABSTRACT

An electric power steering system comprising a power unit consisting essentially of drive circuits for an electric motor and the like, and a control unit separate from the power unit and consisting essentially of a control circuit for controlling the drive circuits. The control unit is connected to each of the drive circuits of the power unit by a transmission line for the control unit to transmit therethrough "ON" or "OFF" representing logical control signals to the drive circuit to thereby control the drive circuit. The power steering system has first signal conversion means provided in the control unit for converting an "ON" representing logical control signal to a pulse signal, and second signal conversion means provided in the power unit and connected to the first signal conversion means by a transmission line for producing an "ON" logical control signal when the input signal given is the pulse signal or for producing an "OFF" logical control signal when the input signal is not the pulse signal.

3 Claims, 8 Drawing Sheets

ELECTRIC POWER STEERING SYSTEM

BACKGROUND OF THE INVENTION

The present invention relates to electric power steering systems.

Electric power steering systems heretofore known include the one shown in FIG. 8 (see, for example, Unexamined Japanese Utility Model Publications SHO 6369671 and SHO 63-69672). In view of the space available for installation, the illustrated electric power steering system is divided into a power unit 10 comprising a drive circuit 11 for an electric motor 1 (motor drive circuit), a drive circuit 12 for an electric clutch 2 (clutch drive circuit), a fail safe relay 13, etc., and a control unit 20 comprising a control circuit 21 including a CPU (central processing unit) for receiving detection signals from a torque sensor 3, speed sensor 4, etc.

With such electric power steering system, the control unit 20 is connected to each drive circuit of the power unit 10 by a transmission line L, through which two kinds of logical control signals, i.e. on and off signals, are sent from the control unit 20 to the power unit 10, whereby the drive circuit of the power unit 10 is driven.

However, the power steering system has the problem that when a break, grounding, faulty contact or the like occurs in one of the transmission lines L, the corresponding drive circuit in the power unit 10 malfunctions, possibly entailing a hazardous situation. For example, if the transmission line L for the drive circuit 11 of the motor 1 breaks and delivers a logical control signal which is fixed always to "ON" state, an unexpected auxiliary steering force is added to the steering force of the driver to give rise to a hazard.

SUMMARY OF THE INVENTION

The main object of the present invention is to provide an electric power steering system having high safety to preclude hazards when a break, grounding, faulty contact or like fault occurs in the transmission line.

The electric power steering system of the present invention comprises a power unit consisting essentially of drive circuits for an electric motor and the like, and a control unit separate from the power unit and consisting essentially of a control circuit for controlling the drive circuits, the control unit being connected to each of the drive circuits of the power unit by a transmission line for the control unit to transmit therethrough "ON" or "OFF" representing logical control signals to the drive circuit to thereby control the drive circuit, the power steering system being characterized in that the system comprises first signal conversion means provided in the control unit for converting an "ON" representing logical control signal to a pulse signal, and second signal conversion means provided in the power unit and connected to the first signal conversion means by a transmission line for producing an "ON" logical control signal when the input signal given is the pulse signal or for producing an "OFF" logical control signal when the input signal is not the pulse signal.

Logical control signals for controlling the drive circuits are so converted by the first signal conversion means of the control unit that the control signal, when representing "ON", is converted to a pulse signal, which is then sent to the second signal conversion means of the power unit through the transmission line.

When the input signal given to the second signal conversion means is a pulse signal, the second signal conversion means produces an "ON" logical control signal. If the input signal to the second signal conversion means is not a pulse signal, the second signal conversion means produces an "OFF" logical control signal. If a fault such as a break occurs in the transmission line, the input signal to the second signal conversion means is always one other than the pulse signal regardless of the waveform of the output from the first signal conversion means, so that the second signal conversion means produces an "OFF" logical control signal. This output of the second signal conversion means is sent to the contemplated drive circuit.

The electric power steering system of the present invention is so adapted that when a break, grounding, faulty contact or like abnormality occurs in the transmission line interconnecting the control unit and the power unit, the corresponding output of the second signal conversion means becomes an "OFF" logical control signal to deenergize the corresponding drive circuit of the power unit. This obviates the hazard that could result from the fault in the transmission line.

DESCRIPTION OF THE PREFERRED EMBODIMENTS

Embodiments of the invention will be described below with reference to FIGS. 1 to 7.

Figure 1:
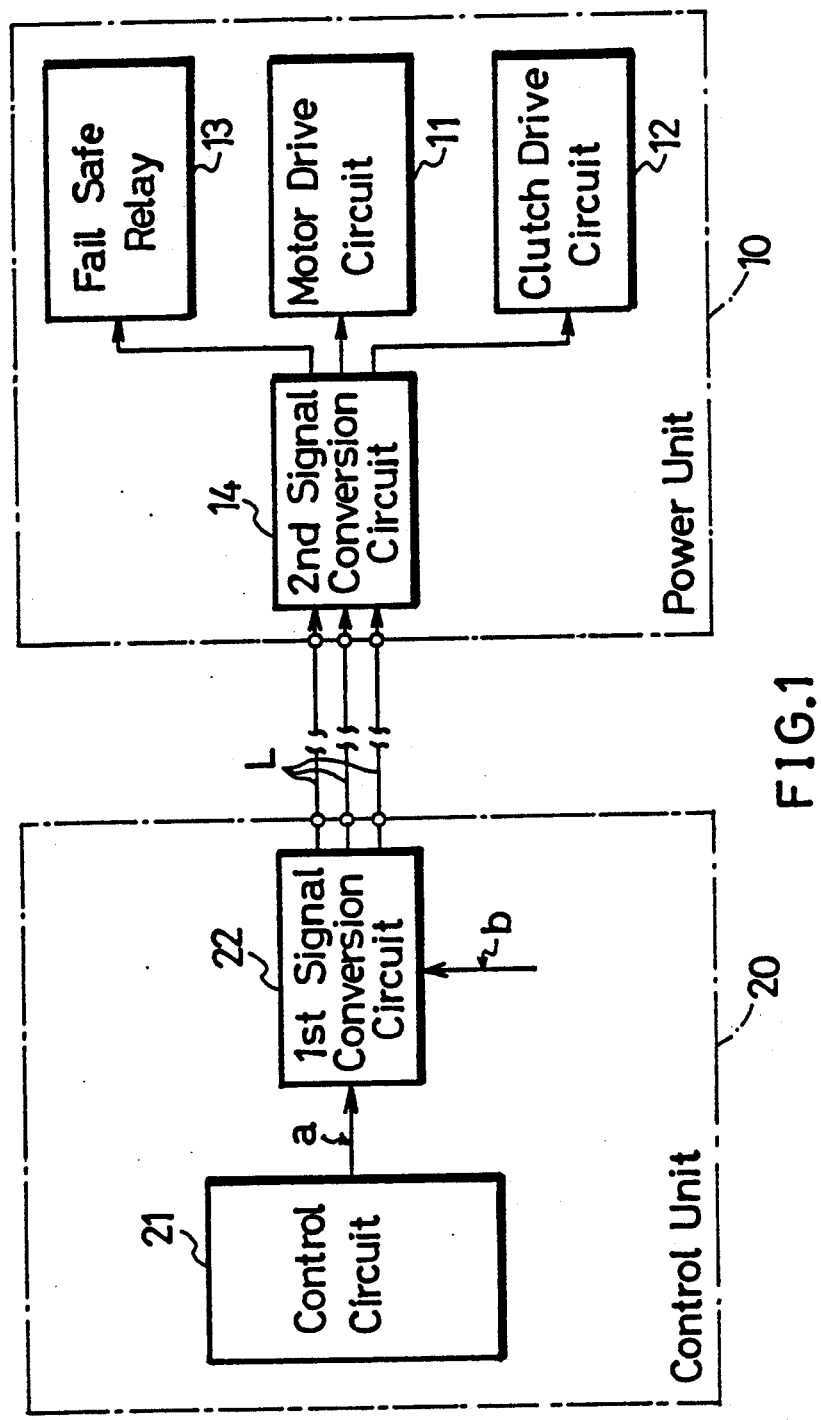
FIG. 1 is an electric block diagram schematically showing the construction of a transmission circuit included in an electric power steering system of the invention.

FIG. 1 shows a transmission circuit for transmitting control signals from a control unit 20 to drive circuits in a power unit 10. The following description will be given of an example where control signals are sent to a power transistor drive circuit included in the motor drive circuit 11. A control signal a has two logical values, i.e. 1 or 0, one of which is an "ON" command to bring a power transistor into conduction. The other logical value is an "OFF" command to turn off the power transistor.

The control signal a is sent to a first signal conversion circuit 22 provided in the control unit 20 and receiving a reference pulse signal b. The control signal a, when representing "ON", is converted by the circuit 22 to a pulse signal based on the reference pulse signal b.

The signal c converted by the first signal conversion circuit 22 is transmitted through a transmission line L to a second signal conversion circuit 14 in the power unit 10. The circuit 14 produces an "ON" control signal when the input signal is the pulse signal or an "OFF" control signal when the input signal is not the pulse signal.

Figure 2:
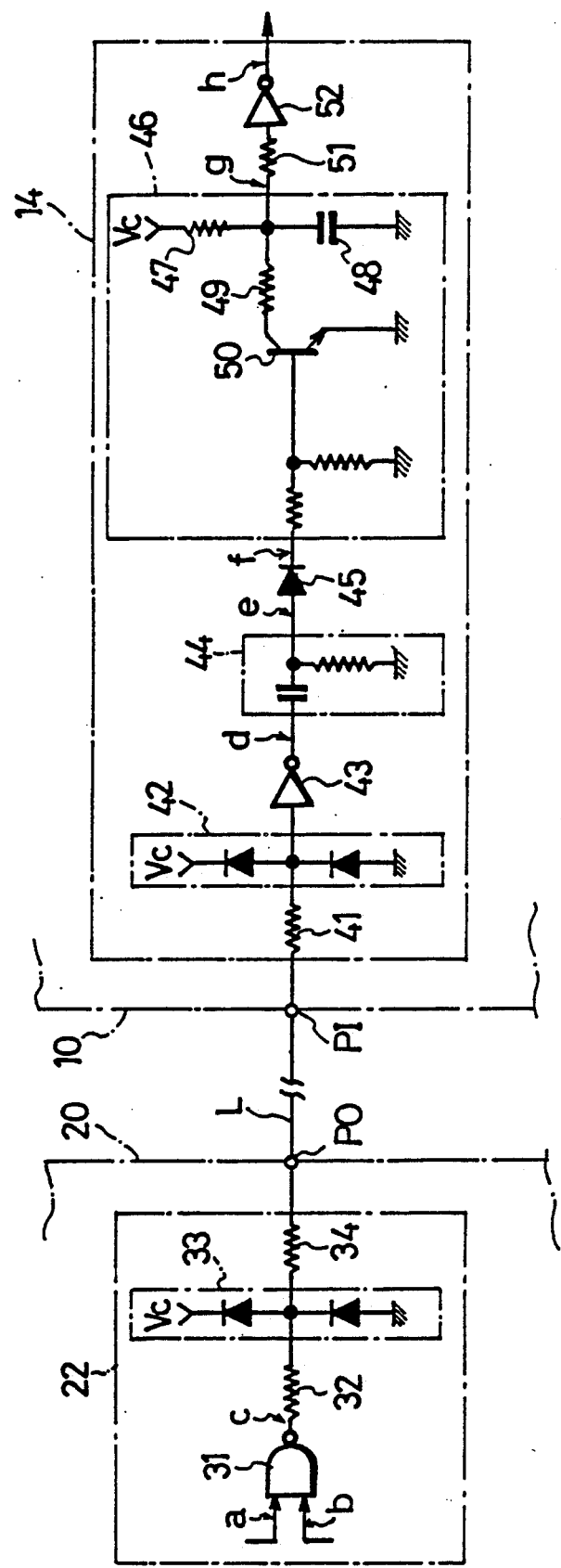
FIG. 2 is an electric circuit diagram showing an example of the transmission circuit.

FIG. 2 shows an example of transmission circuit in detail for use in the case where the control signal a provides an "OFF" command to turn off the power transistor when having a logical value of 0 and an "ON" command to turn on the power transistor when having a logical value of 1.

In the control unit 20, the control signal a is applied to one of the input terminals of a NAND circuit 31, with the reference pulse signal b given to the other input terminal of the circuit 31. The output signal c of the NAND circuit 31 is delivered via a resistor 32, diode clamping circuit 33, resistor 34 and the output terminal PO of the control unit 20 to the transmission line L, through which the signal is fed to the input terminal PI of the power unit 10.

The signal c fed to the input terminal PI of the power unit 10 is sent through a resistor 41 and diode clamping circuit 42 to a first inverter 43, by which the signal c is inverted. The output signal d (=c̄) of the first inverter 43 is fed to a differentiation circuit 44, which in turn produces a positive trigger pulse with the rise of the signal d and a negative trigger pulse with the fall of the signal d. The output signal e of the differentiation circuit 44 is sent to a rectifier diode 45, which outputs only the positive trigger pulses included in the signal e.

The output signal f from the rectifier diode 45 is applied to a charge-discharge circuit 46. This circuit 46 comprises a capacitor 48 having one end connected to a power supply Vc via a charge resistor 47 and the other end which is grounded, and a switching transistor 50 having a collector connected via a discharge resistor 49 to the above-mentioned one end of the capacitor 48 and an emitter which is grounded. The signal f is sent to the base of the switching transistor 50. When the signal f is at L level, the switching transistor 50 is off, so that the capacitor 48 is charged by the power supply Vc. When the signal f is at H level, the transistor 50 is on, with the result that the capacitor 48 is discharged through the discharge resistor 49 and the transistor 50.

The output g of the charge-discharge circuit 46 is fed through a resistor 51 to a second inverter 52 and inverted. The output h (=ḡ) of the inverter 52 is fed to the power transistor drive circuit (not shown) of the motor drive circuit 11.

Figure 3:
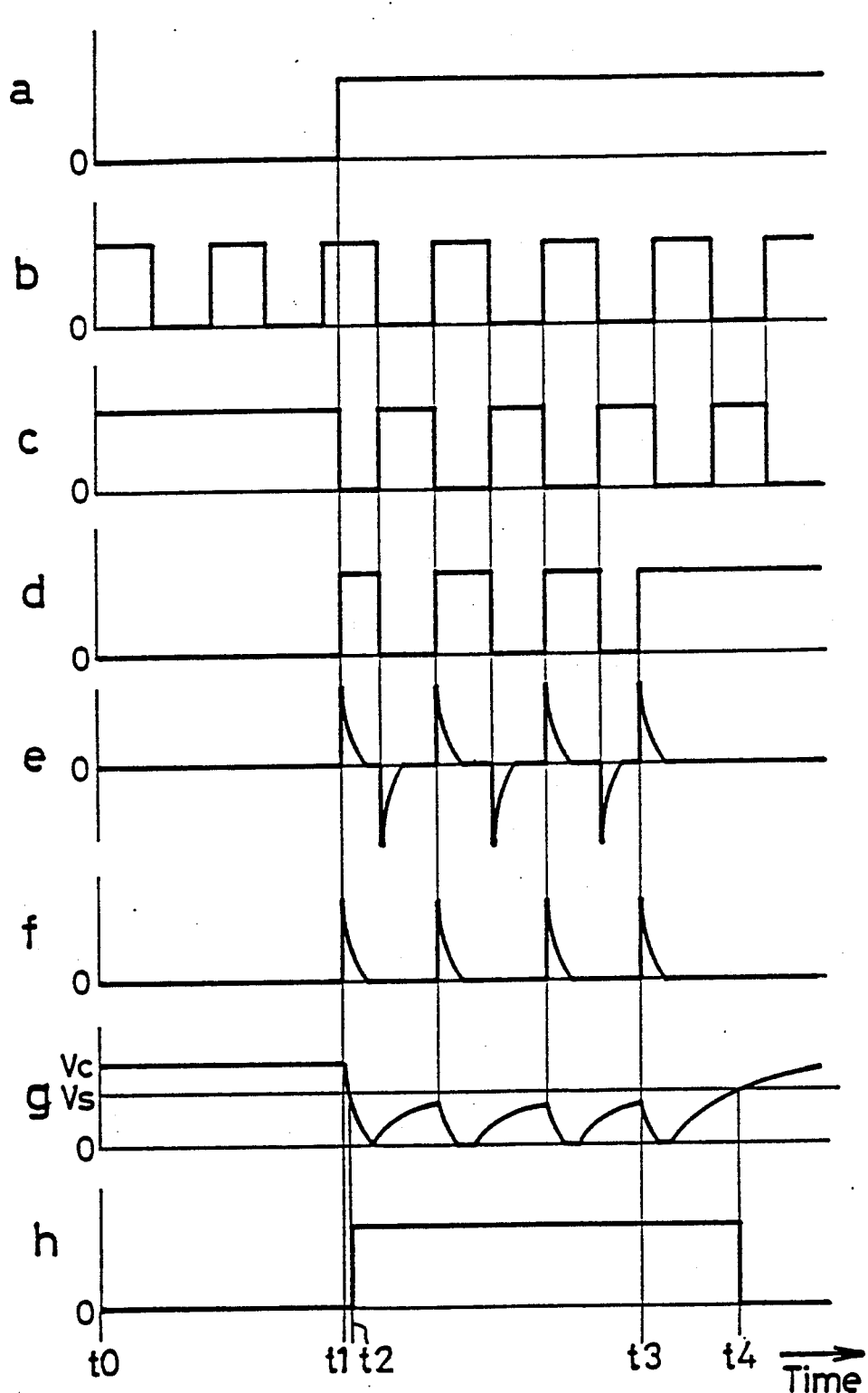
FIG. 3 is a time chart showing signals produced in the circuit of FIG. 2.

FIG. 3 shows the signals produced in the circuit of FIG. 2. When the control signal a has the logical value 0 ("OFF" command signal), i.e. when the control signal a is at L level (time t0–t1), the output c of the NAND circuit 31 is at H level. Accordingly, the output d of the first inverter 43 is low, and the output e of the differentiation circuit 44 and the output f of the rectifier diode 45 remain zero. Since the output f of the diode 45 is zero, the switching transistor 50 is off, with the capacitor 48 of the charge-discharge circuit 46 charged, and the output voltage g of the charge-discharge circuit 46 becomes equal to the power supply voltage Vc. The voltage vc is higher than the threshold voltage Vs of the second inverter 52, so that the output h of the second inverter 52 is at L level, thus giving an "OFF" command like the control signal a. Consequently, the power transistor corresponding to the motor drive circuit 11 is turned off.

When the control signal a is inverted to H level ("ON" command) at time t1, the output c of the NAND circuit 31 becomes a pulse signal which is at L level when the reference pulse signal b is at H level and at H level when the pulse signal b is at L level. The first inverter 43 delivers an output pulse signal d which is in the form of the output c of the NAND circuit 31 as inverted.

The differentiation circuit 44 produces a positive trigger pulse with the rise of the pulse signal d output from the first inverter 43 and a negative trigger pulse with the fall of the signal d. The rectifier diode 45 eliminates the negative trigger pulses thus produced.

Upon production of the positive trigger pulse from the rectifier diode 45, the switching transistor 50 of the charge-discharge circuit 46 conducts, discharging the capacitor 48 and temporarily lowering the output voltage g of the circuit 46 to zero. When the output voltage of the charge-discharge circuit 46 decreases to a level lower than the threshold voltage Vs of the second inverter 52 (time t2), the output h of the second inverter 52 is inverted to H level. When the output f of the rectifier diode 45 decreases to zero, the switching transistor 50 is brought out of conduction, permitting the capacitor 48 to be charged to gradually increase the output voltage g of the charge-discharge circuit 46. When the rectifier diode 45 produces another positive trigger pulse, the capacitor 48 is discharged to decrease the output voltage g of the charge-discharge circuit 46 to zero again. With the decrease of the output f of the diode 45 to zero, the capacitor 48 is charged to gradually increase the output voltage g of the circuit 46.

Thus, the capacitor 48 of the charge-discharge circuit 46 is repeatedly discharged and charged every time the rectifier diode 45 produces a positive trigger pulse to repeatedly decrease and increase the output g of the charge-discharge circuit 46. The period of the reference pulse signal b and the time constant of the charge-discharge circuit 46 are so determined that the output voltage g of the circuit 46 will not exceed the threshold voltage Vs of the second inverter 52 during the chargedischarge operation. Accordingly, when the control signal a rises to H level, the output h of the second inverter 52 becomes high to turn on the power transistor.

When a break occurs in the transmission line L at time t3 with the control signal at H level ("ON" command), the input signal of the first inverter 43 changes to L level regardless of the voltage level of the reference pulse signal b, with the result that the output d of the first inverter 43 changes to H level and remains at this level.

If a break occurs in the transmission line L when the output d of the first inverter 43 is at L level, the output d of the first inverter 43 changes to H level and remains at this level. Upon the change of the first inverter output d to H level (time t3), the differentiation circuit 44 produces a positive trigger pulse, and the rectifier diode 45 outputs the positive trigger pulse. Nevertheless, the output d of the first inverter 43 remains at H level since time t3 when the break occurred in the transmission line L, so that the differentiation circuit 44 and the diode 45 thereafter deliver no trigger pulse.

When the rectifier diode 45 produces the positive trigger pulse at time t3, the switching transistor 50 conducts, discharging the capacitor 48 of the charge-discharge circuit 46 to temporarily decrease the output voltage g of the charge-discharge circuit 46 to zero. However, the output of the rectifier diode 45 remains zero since the positive trigger pulse is produced, so that the transistor 50 is thereafter turned off to charge the capacitor 48. Consequently, the output voltage g of the circuit 46 increases to the level of the power supply voltage Vc, i.e. to the steady state. When the increasing output voltage g of the circuit 46 exceeds the threshold voltage Vs of the second inverter 52 (time t4), the output h of the second inverter 52 is inverted to L level ("OFF" command) to turn off the power transistor.

When a break occurs in the transmission line L with the control signal a at L level ("OFF" command), the output d of the first inverter 43 remains at H level. The output h of the second inverter 52 changes to L level, permitting the power transistor to remain off.

In brief, when the transmission line L of the transmission circuit described is free of a fault such as break, grounding or faulty contact, the control signal a can be accurately transmitted from the control unit 20 to the power transistor drive circuit of the motor drive circuit 11 in the power unit 10, whereas if such a fault occurs in the transmission line L, an "OFF" command can be given to the power transistor drive circuit even if the control signal a is an "ON" command as when it is an "OFF" command.

Figure 4:
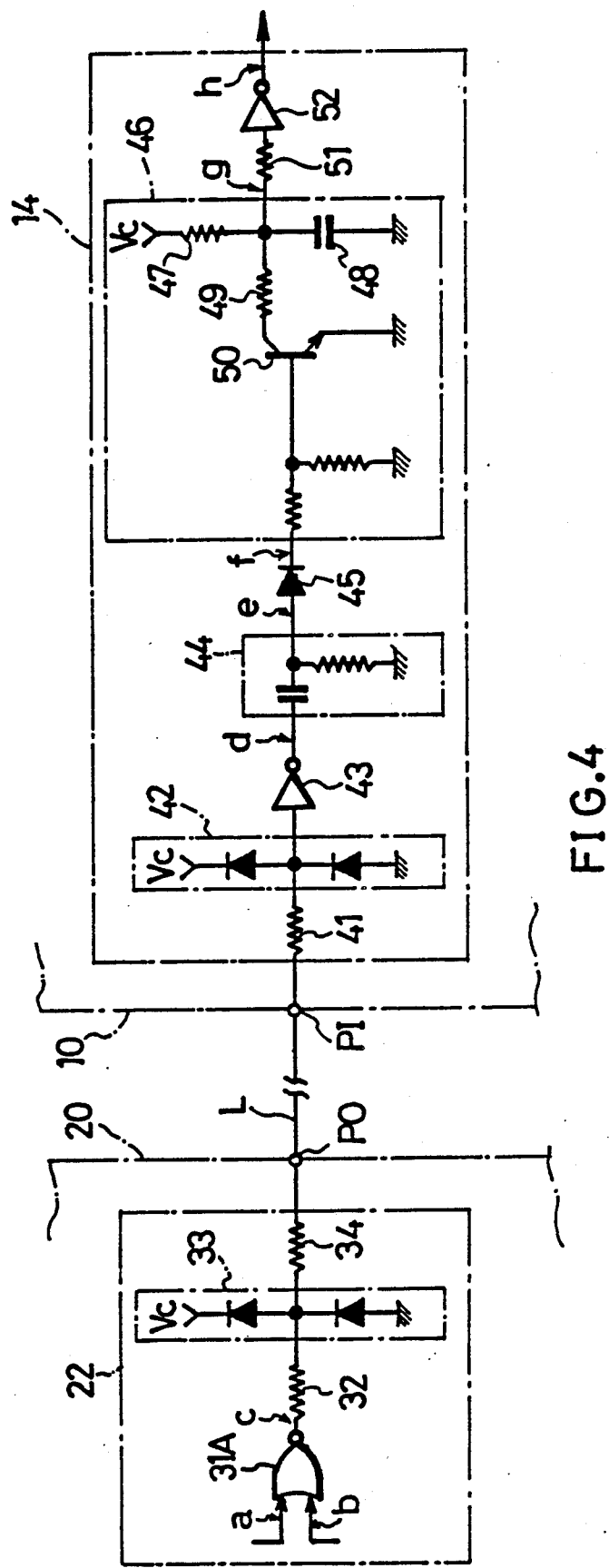
FIG. 4 is an electric circuit diagram showing another example of transmission circuit.
Figure 5:
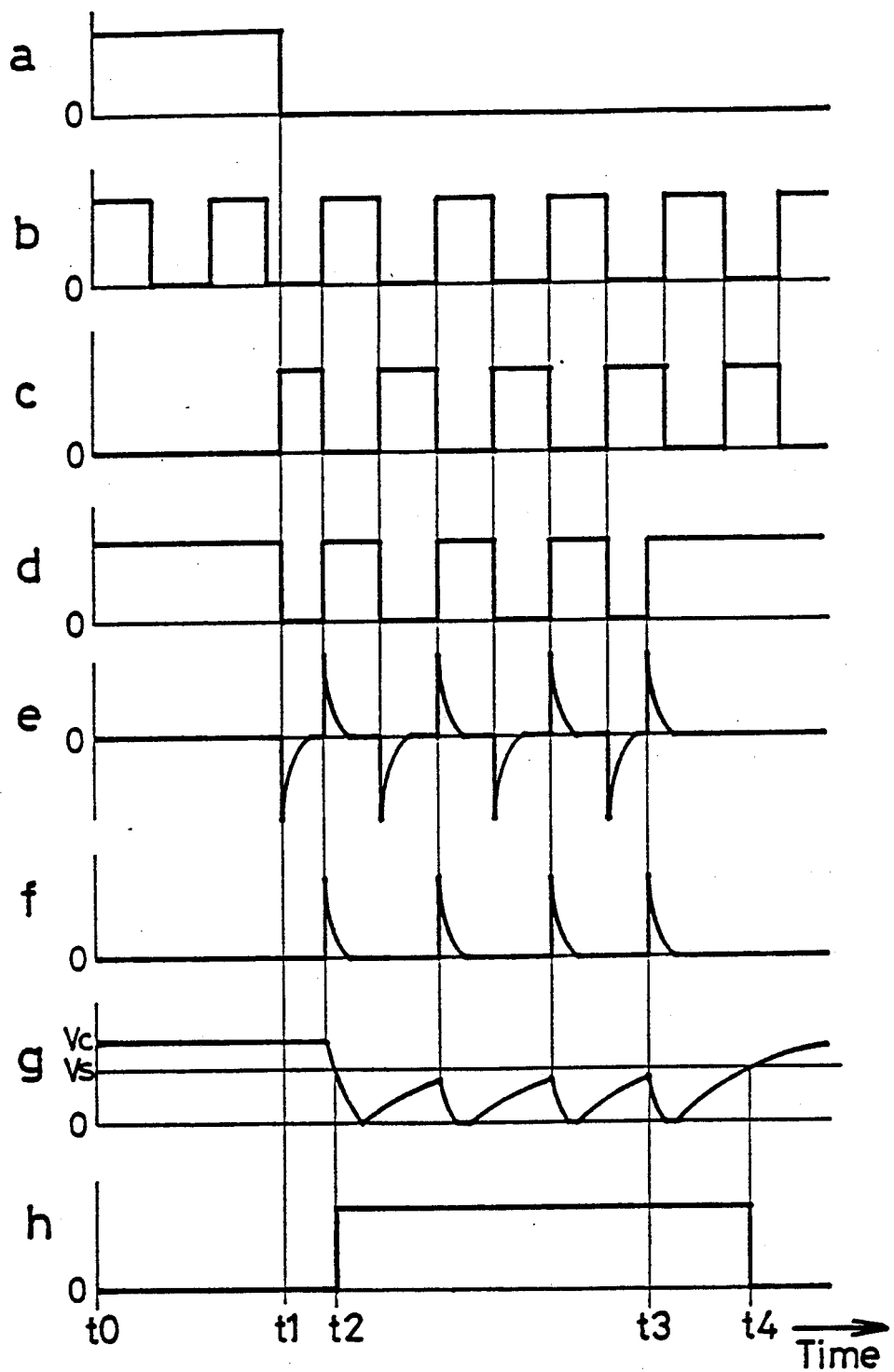
FIG. 5 is a time chart showing signals produced in the circuit of FIG. 4.

FIG. 4 shows a transmission circuit wherein the control signal a gives an "ON" command to turn on the power transistor when having a logical value of 0 and an "OFF" command to turn off the power transistor when having a logical value of 1. FIG. 5 shows the signals produced in the circuit of FIG. 4. Throughout FIGS. 2 and 4, like parts and like signals or outputs are designated by like reference numerals or symbols. The transmission circuit differs from the circuit of FIG. 2 in that a NOR circuit 31A is used in place of the NAND circuit 31.

When the control signal a has the logical value 1 ("OFF" command signal), i.e. when the control signal a is at H level (time t0-tl), the output c of the NOR circuit 31A is at L level. Accordingly, the output d of the first inverter 43 is high, and the output e of the differentiation circuit 44 and the output f of the rectifier diode 45 remain zero. Since the output f of the diode 45 is zero, the switching transistor 50 is off, with the capacitor 48 of the charge-discharge circuit 46 charged, and the output voltage g of the charge-discharge circuit 46 becomes equal to the power supply voltage vc. The voltage Vc is higher than the threshold voltage Vs of the second inverter 52, so that the output h of the second inverter 52 is at L level, thus giving an "OFF" command like the control signal a. Consequently, the power transistor corresponding to the motor drive circuit 11 is turned off.

When the control signal a is inverted to L level ("ON" command) at time tl, the output c of the NOR circuit 31A becomes a pulse signal which is at L level when the reference pulse signal b is at H level and at H level when the pulse signal b is at L level. The first inverter 43 delivers an output pulse signal d which is in the form of the output c of the NOR circuit 31A as inverted.

The differentiation circuit 44 produces a positive trigger pulse with the rise of the pulse signal d output from the first inverter 43 and a negative trigger pulse with the fall of the signal d. The rectifier diode 45 eliminates the negative trigger pulses thus produced.

Upon production of the positive trigger pulse from the rectifier diode 45, the switching transistor 50 of the charge-discharge circuit 46 conducts, discharging the capacitor 48 and temporarily lowering the output voltage g of the circuit 46 to zero. When the output voltage g of the charge-dischargeccircuit 46 decreases to a level lower than the threshold voltage Vs of the second inverter 52 (time t2), the output h of the second inverter 52 is inverted to H level. When the output f of the rectifier diode 45 decreases to zero, the switching transistor 50 is brought out of conduction, permitting the capacitor 48 to be charged to gradually increase the output voltage g of the charge-discharge circuit 46. When the rectifier diode 45 produces another positive trigger pulse, the capacitor 48 is discharged to decrease the output voltage g of the charge-discharge circuit 46 to zero again. With the decrease of the output f of the diode 45 to zero, the capacitor 48 is charged to gradually increase the output voltage f of the circuit 46.

The period of the reference pulse signal b and the time constant of the charge-discharge circuit 46 are so determined that the output voltage g of the circuit 46 will not exceed the threshold voltage Vs of the second inverter 52 during the charge-discharge operation. Accordingly, when the control signal a is at L level, the output h of the second inverter 52 becomes high to turn on the power transistor.

When a break occurs in the transmission line L at time t3 with the control signal a at L level ("ON" command), the input signal of the first inverter 43 changes to L level regardless of the voltage level of the reference pulse signal b, with the result that the output d of the first inverter 43 changes to H level and remains at this level.

If a break occurs in the transmission line L when the output d of the first inverter 43 is at L level, the output d of the first inverter 43 changes to H level and remains at this level. Upon the change of the first inverter output d to H level (time t3), the differentiation circuit 44 produces a positive trigger pulse, and the rectifier diode 45 outputs the positive trigger pulse. Nevertheless, the output d of the first inverter 43 remains at H level since time t3 when the break occurred in the transmission line L, so that the differentiation circuit 44 and the diode 45 thereafter deliver no trigger pulse.

When the rectifier diode 45 produces the positive trigger pulse at time t3, the switching transistor 50 conducts, discharging the capacitor 48 of the charge-discharge circuit 46 to temporarily decrease the output voltage g of the charge-discharge circuit 46 to zero. However, the output of the rectifier diode 45 remains zero since the positive trigger pulse is produced, so that the transistor 50 is thereafter turned off to charge the capacitor 48. Consequently, the output voltage g of the circuit 46 increases to the level of the power supply voltage Vc, i.e. to the steady state. When the increasing output voltage g of the circuit 46 exceeds the threshold voltage Vs of the second inverter 52 (time t4), the output h of the second inverter 52 is inverted to L level to turn off the power transistor.

When a break occurs in the transmission line L with the control signal a at H level ("OFF" command), the output d of the first inverter 43 remains at H level, so that the output h of the second inverter 52 changes to L level, permitting the power transistor to remain off.

Although the embodiments described above are transmission circuits for transmitting control signals from the control unit 20 to the motor drive circuit 11 in the power unit 10, the present invention is of course applicable to the transmission circuit for delivering control signals from the control unit 20 to a clutch drive circuit 12, fail safe relay 13 or the like in the power unit 10.

The fail safe control signal is usually sent from the control unit 20 to the fail safe relay 13 or the like in the power unit 10. However, in order to completely avoid a malfunction due to a failure such as a break in the transmission line, it is desirable that the power unit be provided with a failure diagnosis circuit for the components of the power unit 10 and a fail safe control circuit so that fail safe control can be effected also by the power unit alone.

Figure 6:
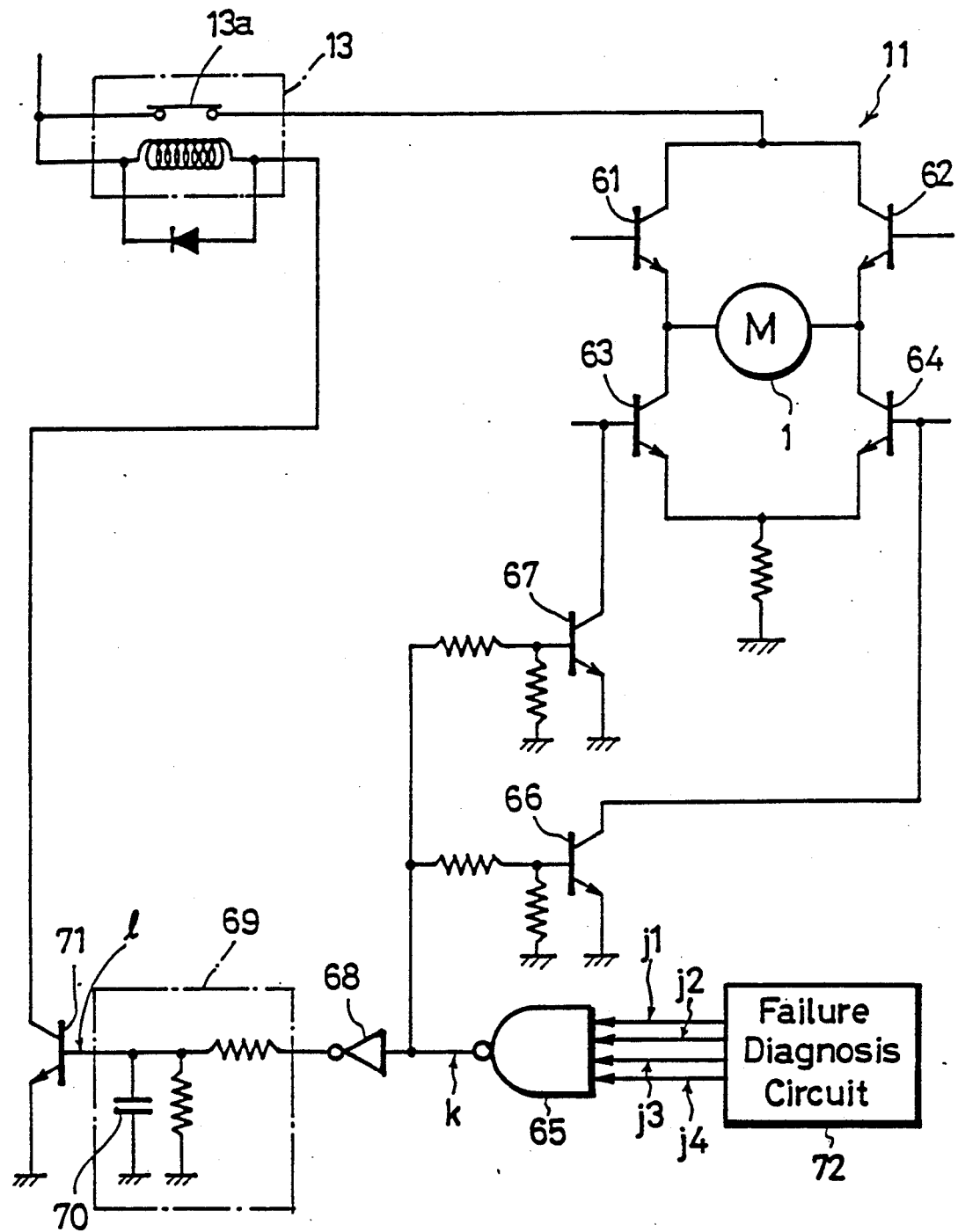
FIG. 6 is an electric circuit diagram showing an example of fail safe control circuit provided in a power unit.
Figure 7:
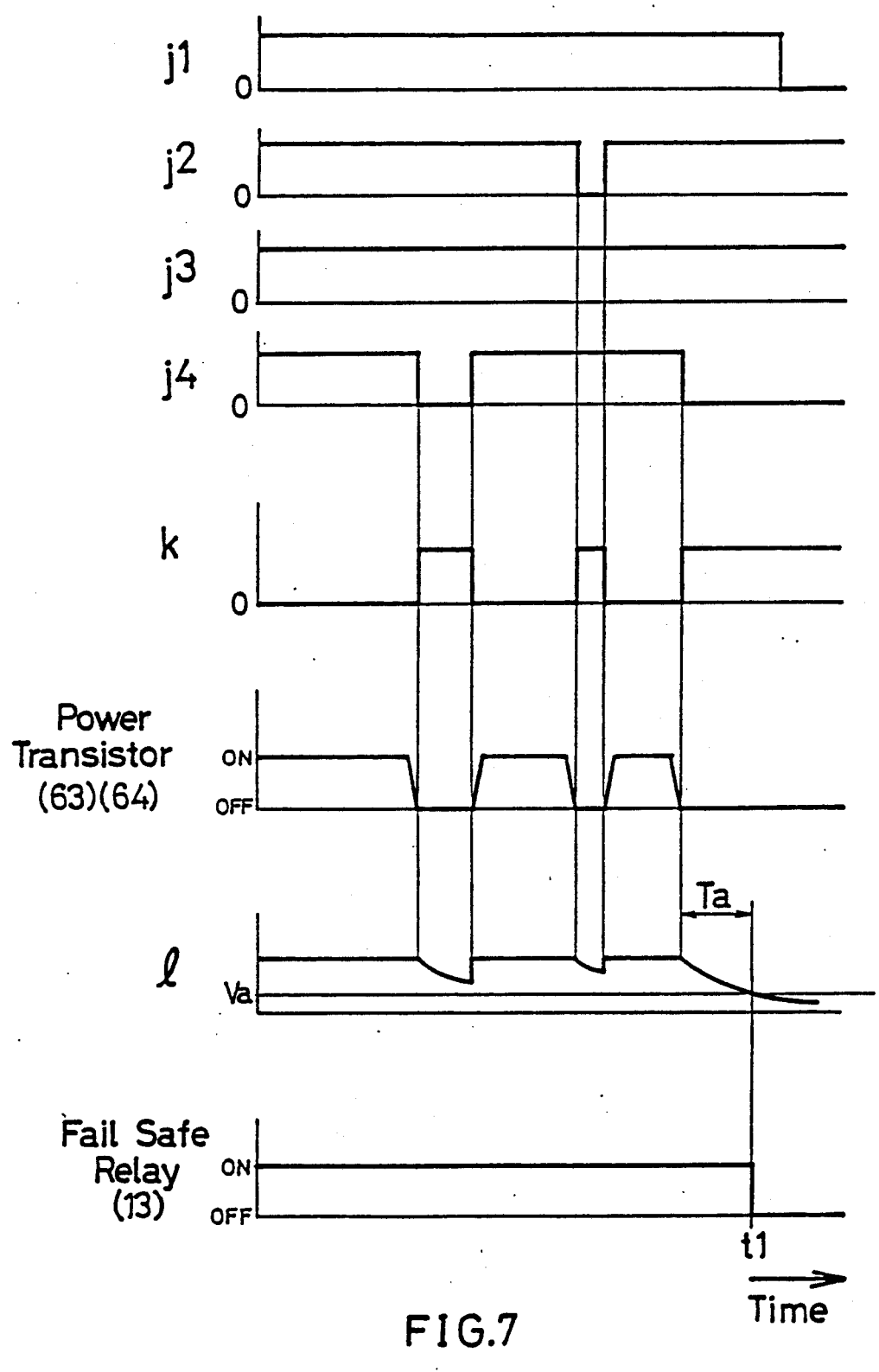
FIG. 7 is a time chart showing signals produced in the circuit of FIG. 6 and the operation of a power transistor and a fail safe relay.
Figure 8:
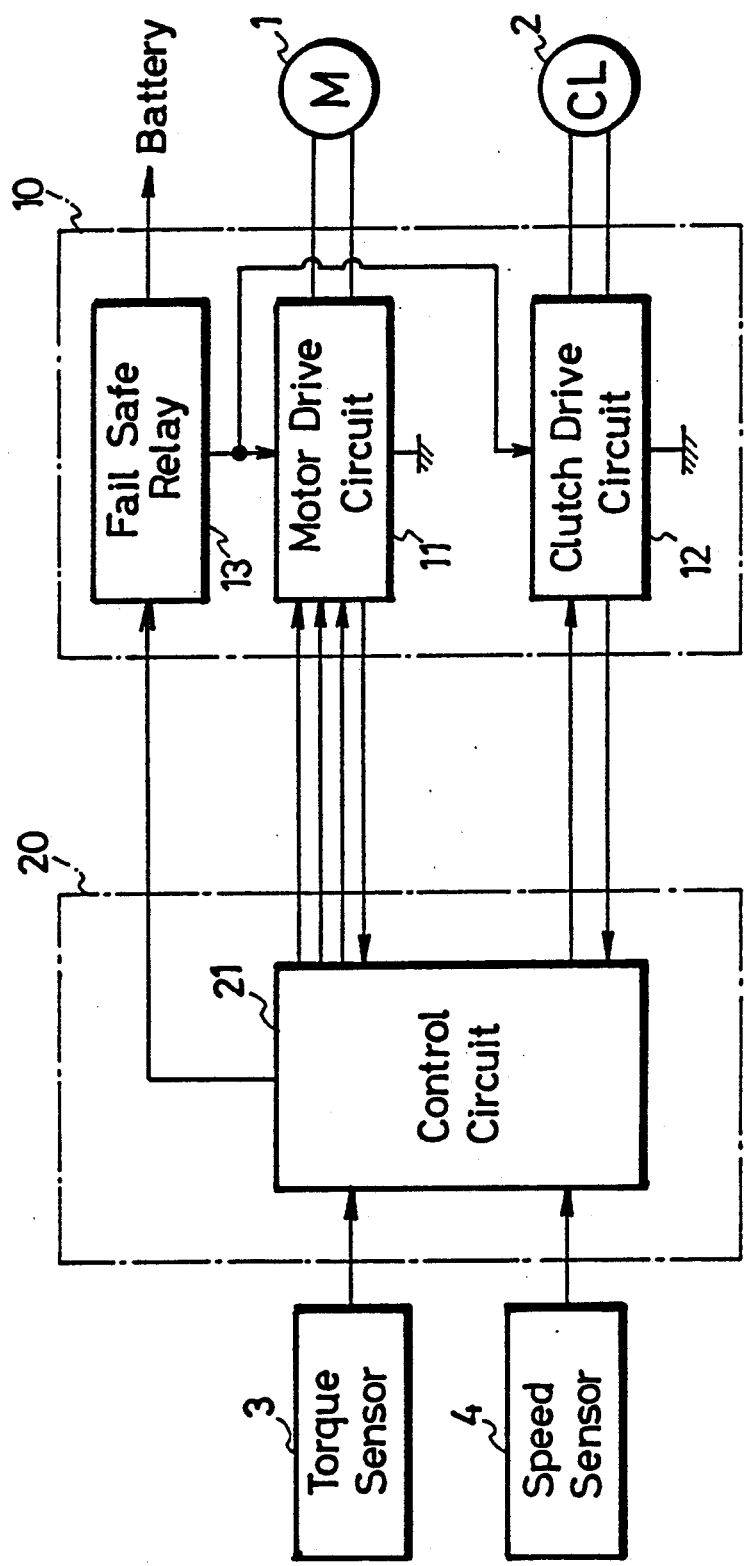
FIG. 8 is an electric block diagram showing the overall construction of a conventional electric power steering system.

FIG. 6 shows an example of fail safe control circuit which is so adapted that fail safe control can be effected also by the power unit singly. FIG. 7 shows the signals produced in the circuit of FIG. 6. A motor drive circuit 11 is in the form of a bridge circuit comprising four power transistors 61, 62, 63 and 64. The power transistors 61, 64 are used for forward rotation, and the power transistors 62, 63 for reverse rotation.

A failure diagnosis circuit 72 for the motor drive circuit 11, clutch drive circuit 12, etc. feeds failure detection signals j1–j4 to a NAND circuit 65. The failure diagnosis circuit 72 is provided in the power unit. The failure detection signals j1 to j4 are normally at H level, whereas if one of the components being checked failed, the corresponding signal changes to L level.

When at least one of the detection signals j1 to j4 becomes low, the output k of the NAND circuit 65 changes to H level, whereupon a fail safe switching transistor 66 connected to the base of the downstream forward-rotation power transistor 64 and a fail safe switching transistor 67 connected to the base of the downstream reverse-rotation power transistor 63 are both brought into conduction. Consequently, the power transistors 64 and 63 are forcibly brought out of conduction.

Further with the change of the output k of the NAND circuit 65 to H level, the output of an inverter 68 connected to the NAND circuit 65 is inverted to L level to draw off the charge on a capacitor 70 in a charge-discharge circuit 69. When the output of the NAND circuit 65 remains at H level for at least a specified interval of time Ta, the output voltage l of the charge-discharge circuit 69 becomes lower than the operating voltage Va of a switching transistor 71 (time t1), whereupon the transistor 71 is brought out of conduction to deenergize the fail safe relay 13 and open the contact 13a thereof. Consequently, the supply of power to the motor 1 is discontinued.

The fail safe relay 13 is not deenergized immediately when the output of the NAND circuit 65 changes to H level but is deenergized after the NAND circuit output remains at H level for at least the specified time interval so as to avoid deenergization of the fail safe relay 13 due to a malfunction of the failure diagnosis circuit 72.

What is claimed is:

1. An electric power steering system comprising:
   a power unit having a plurality of drive circuits for operating electric components of said power steering system;
   a control unit having a control circuit for controlling said drive circuits, said control unit being connected to each of said plurality of drive circuits by at least the transmission line, said at least one transmission line having transmitted therethrough logic control signals representing "on" or "off" logic states for controlling said drive circuits;
   first signal conversion means, provided in said control unit, for converting a logic control signal representing a first "on" logic state to a pulse signal;
   second signal conversion means, provided in said power unit and being connected to said first signal conversion means, for receiving an input signal therefrom through said at least one transmission line, said second signal conversion means for converting said input signal to a second "on" logic control signal when said input signal is said pulse signal and for converting said input signal to an "off" logic control signal when said input signal is not said pulse signal;
   wherein said drive circuits are energized upon receiving said second "on" logic control signal from said second signal conversion means and are deenergized upon receiving said "off" logic control signal from said second signal conversion means.

2. An electric power steering system according to claim 1, wherein said power unit comprises:
   a fail safe relay;
   a failure diagnosis circuit for detecting failures occurring in said power unit; and
   a fail safe circuit for deenergizing the fail safe relay when said failure diagnosis circuit detects a failure in said power unit.

3. An electric power steering system according to claim 1, wherein said second conversion means further comprises charge/discharge means and means for generating a trigger pulse in response to said pulse signal, said trigger pulse causing said charge/discharge means to alternately charge and discharge a discharge voltage, wherein when said discharge voltage remains below a predetermined reference voltage $V_s$, said second conversion means outputs said "on" logic control signal, and when said discharge voltage exceeds said predetermined reference voltage $V_s$, said second conversion means outputs said "off" logic control signal.

* * * * *